United States Patent
Heuer et al.

(10) Patent No.: US 7,797,346 B2
(45) Date of Patent: Sep. 14, 2010

(54) METHOD FOR IMPROVING THE FUNCTIONALITY OF THE BINARY REPRESENTATION OF MPEG-7 AND OTHER XML BASED CONTENT DESCRIPTIONS

(75) Inventors: Jörg Heuer, Munich (DE); Andreas Hutter, Munich (DE); Ulrich Niedermeier, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 466 days.

(21) Appl. No.: 10/467,047

(22) PCT Filed: Jan. 31, 2002

(86) PCT No.: PCT/DE02/00343

§ 371 (c)(1),
(2), (4) Date: Jan. 27, 2004

(87) PCT Pub. No.: WO02/062070

PCT Pub. Date: Aug. 8, 2002

(65) Prior Publication Data

US 2004/0107297 A1    Jun. 3, 2004

(30) Foreign Application Priority Data

Feb. 1, 2001    (DE)   ............... 101 04 537

(51) Int. Cl.
*G06F 7/00*    (2006.01)
*G06F 17/30*    (2006.01)

(52) U.S. Cl. ...................... 707/793; 709/247
(58) Field of Classification Search ............ 707/103 R, 707/3, 6, 100, 200; 715/513; 709/246
See application file for complete search history.

(56) References Cited

U.S. PATENT DOCUMENTS

| | | | |
|---|---|---|---|
| 6,910,068 B2 * | 6/2005 | Zintel et al. | 709/220 |
| 2002/0138517 A1 * | 9/2002 | Mory et al. | 707/513 |
| 2003/0110297 A1 * | 6/2003 | Tabatabai et al. | 709/246 |
| 2003/0172345 A1 * | 9/2003 | Engelsberg et al. | 715/501.1 |
| 2004/0193911 A1 * | 9/2004 | Kaler et al. | 713/200 |

FOREIGN PATENT DOCUMENTS

DE    100 47 338 A1    4/2002

(Continued)

OTHER PUBLICATIONS

Deutsch. et al. "XML-QL: A Query Language for XML", Aug. 19, 1998, W3C, pp. 1-19.*

(Continued)

*Primary Examiner*—Sathyanarayan Pannala
(74) *Attorney, Agent, or Firm*—King & Spalding L.L.P.

(57) ABSTRACT

A method is provided for encoding string-based data types, which have, for example, a tree-type structure, in such a way that signal bits (flags) for optional sections and/or for length information concerning the codes that are of variable length are placed in a defined sequence at the beginning of the created bitstream, thus accelerating the search for data via a sorting process and bit mask queries. A more efficient encoding is also provided of the #position field by, among other things, the assignment of code fragments for each group of regular expressions.

7 Claims, 5 Drawing Sheets

| Structure to be coded | RRA(T)<br>#SchemaBranch Code | SBC | #pos<br>#position Code |
|---|---|---|---|
| <complexType name="Sample "> | | | |
| <sequence maxOccurs="7"> | | | |
| <choice minOccurs="2" maxOccurs="unbounded"> | | | CF |
| <element ref="a"/> | 001 | | XXX YYYY... |
| <element ref="b"/> | 010 | | XXX YYYY... |
| </choice> | | | |
| <sequence> | | | |
| <element ref="c" maxOccurs="unbounded"/> | 011 | | XXX ZZZZ... |
| <element ref="a"/> | 100 | | XXX |
| </sequence> | | | |
| </sequence> | | | |
| </complexType> | | | |

FOREIGN PATENT DOCUMENTS

| | | | |
|---|---|---|---|
| DE | EP 1 223 759 A | | 7/2002 |
| EP | 0 928 070 | | 7/1999 |
| EP | 0 928 070 A2 | | 7/1999 |
| EP | 0928070 | * | 7/1999 |
| EP | 1 122 655 | | 8/2001 |
| EP | 1 122 655 A2 | | 8/2001 |
| EP | 1122655 | * | 8/2001 |
| WO | WO 97/34240 | | 9/1997 |
| WO | WO9734240 | * | 9/1997 |

OTHER PUBLICATIONS

Coding of moving pictures and associated audio: ISO/IEC JTC1/SC29/WG11/N3701 Oct. 2001 (LA BAULE) Text of ISO/IEC CD 15938-1 Information technology—Multimedia description interface—Part 1 System, XP002172899.

"Application specific extension code for binary MPEG-7 data", International Organization for Standardization ISO/IEC JTC1/SC29/WG11 Coding of Moving Pictures and Audio MPEG2001/6838 Jan. 2001.

Cédric Thiénot, Claude Seyrat, Grégoire Pau "Datatypes encoding improvements for BiM" Source: Expway, International Organization for Standardization; ISO/IEC JTC1/SC29/WG11 Coding of Moving Pictures and Associated Audio, MPEG01/M6853 Jan. 2001, Pisa, IT.

C. Thiénot, C. Seyrat, G. Pau "BiM navigation path improvement", Source: Expway, International Organization for Standardization, ISO/IEC JTC 1/SC29/WG11/M6854, Coding of Moving Pictures and Audio, Jan. 2001, Pisa.

ISO/IEC JTC1/SC29/WG11,Sep. 1, 2001; ISO/IEC FDIS 15938-1:2001(E); Information Technology—Multimedia Content Description Interface—Part 1:Systems.

XML Schema Part 2: Datatypes www.w3.org/TR/2001/REC-xmlschema-2-20010502/ , May 2001.

J. Heuer, A. Hutter (Siemens), U. Niedermeier (TU München) "Improved filtering functionality for the binary representation of MPEG-7 descriptions (BIM)" ISO/IEC JTC1/SC29/WG11/M6795, Pisa, Jan. 2001 International Organization for standardization.

* cited by examiner

FIG 2

| Representation for regular expression | Number of bits |
|---|---|
| Flag1 | 1 |
| if (flag1){ | |
| "." | 0 |
| Flag2 | 1 |
| if (flag2){ | |
| \d+ | UINT VLC |
| flag2.1 | 1 |
| if (flag2.1){ | |
| "." | 0 |
| \d{2} | 7 |
| flag2.1.1 | 1 |
| if (flag2.1.1){ | |
| "." | 0 |
| \d{2} | 7 |
| } | |
| } | |
| } | |
| flag3 | 1 |
| if (flag3){ | |
| "." | 0 |
| \d{2} | 7 |
| flag3.1 | 1 |
| if (flag3.1){ | |
| "." | 0 |
| \d{2} | 7 |
| flag3.1.1 | 1 |
| if (flag3.1.1){ | |
| "." | 0 |
| \d{2} | 7 |
| flag3.1.1.1 | 1 |
| if (flag3.1.1.1){ | |
| "." | 0 |
| \d+ | UINT VLC |
| flag3.1.1.1.1 | 1 |
| if (Flag3.1.1.1.1){ | |
| "." | 0 |
| \d{2} | 7 |
| } | |
| } | |
| } | |
| } | |
| } | |
| flag4 | 1 |
| if (flag4){ | |
| F | 0 |
| \d+ | UINT VLC |
| } | |
| flag5 | 1 |
| if (flag5){ | |
| "+" | 0 |
| else | |
| "." | 0 |
| \d{2} | 7 |
| "." | 0 |
| \d{2} | 7 |

RRA2(T(S))

| Representation for regular expression | Number of bits |
|---|---|
| Flag1 | 1 |
| Flag2 | 1 |
| if (Flag2){ | |
| flag2.1 | 1 |
| if (flag2.1){ | |
| flag2.1.1 | 1 |
| } | |
| } | |
| flag3 | 1 |
| if (Flag3){ | |
| flag3.1 | 1 |
| if (flag3.1){ | |
| flag3.1.1 | 1 |
| if (flag3.1.1){ | |
| flag3.1.1.1 | 1 |
| if (flag3.1.1.1){ | |
| flag3.1.1.1.1 | 1 |
| } | |
| } | |
| } | |
| } | |
| flag4 | 1 |
| flag5 | 1 |
| if (Flag2){ | |
| VLC 2 | VLC Length |
| } | |
| if (Flag3.1.1.1){ | |
| VLC 3.1.1.1 | VLC Length |
| } | |
| if (Flag4){ | |
| VLC 4 | VLC Length |
| } | |
| if (flag1) | |
| "." | 0 |
| if (flag2){ | |
| \d+ | VLC 2 |
| if (flag2.1){ | |
| "." | 0 |
| \d{2} | 7 |
| if (flag2.1.1){ | |
| "." | 0 |
| \d{2} | 7 |
| } | |
| } | |
| } | |
| if (flag3){ | |
| T | 0 |
| \d{2} | 7 |
| if (flag3.1){ | |
| "." | 0 |
| \d{2} | 7 |
| if (flag3.1.1){ | |
| "." | 0 |
| \d{2} | 7 |
| if (flag3.1.1.1){ | |
| "." | 0 |
| \d+ | 8*VLC 3.1.1.1 |
| if (flag3.1.1.1.1){ | |
| "." | 0 |
| \d{2} | 7 |
| } | |
| } | |
| } | |
| } | |
| } | |
| if (flag4){ | |
| F | 0 |
| \d+ | 8*VLC 4 |
| } | |
| if (flag5){ | |
| "+" | 0 |
| else | |
| "." | 0 |
| \d{2} | 7 |
| "." | 0 |
| \d{2} | 7 |

BS2, SOP, LVLC, RBG

FIG 4

| Structure to be coded | #SchemaBranch Code | #position Code |
|---|---|---|
| <complexType name="Sample "> | | |
| <sequence maxOccurs="7"> | | CF |
| <choice minOccurs="2" maxOccurs="unbounded"> | | |
| <element ref="a"/> | 001 | XXX YYYY... |
| <element ref="b"/> | 010 | XXX YYYY... |
| </choice> | | |
| <sequence> | | |
| <element ref="c" maxOccurs="unbounded"/> | 011 | XXX ZZZZ... |
| <element ref="a"/> | 100 | XXX |
| </sequence> | | |
| </sequence> | | |
| </complexType> | | |

RRA(T)    SBC    #pos

METHOD FOR IMPROVING THE FUNCTIONALITY OF THE BINARY REPRESENTATION OF MPEG-7 AND OTHER XML BASED CONTENT DESCRIPTIONS

BACKGROUND OF THE INVENTION

The present invention relates to the encoding and decoding of XML-based structured documents, as provided for in MPEG-7, for example. XML (extensible markup language) is a standard for the definition of document structures and is used to represent structured data in a text file and typically forms the basis of the language XHTML. These XML-based structured documents are based on a set of structured elements (also referred to as a "Schema" below in this document) as can be specified, for example, using Document Type Definition (DTD), XML Schema or Multimedia Description Schemes (DS).

The binary format of MPEG-7 files and the setting up of navigation paths using tree-structured code tables is known from as in the listed publication [1] (hereafter "[1]"), for example.

The present invention further relates to the optimization of the encoding of structured XML documents. An underlying object of the present invention lies in specifying methods for improving the functionality of the binary representation of XML-based content descriptions, especially of MPEG-7 documents, in which the volume of data to be transmitted is as small as possible and search processes within the encoded document as well as the further processing of the encoded document are as simple as possible.

SUMMARY OF THE INVENTION

One of the conclusions from [1] is that the structure of an XML document can be recorded as a data tree in which each element of the description corresponds to a node in the tree. The structure of the nodes is determined by the definition in the schema underlying the document. In particular, it defines the type and number of child elements. The prototype of such a node is shown, for example, on Page 19 of [1]. This tree structure node includes the name of the element or complex type, a field with code words TBC (Tree Branch Code) which serve to reference the child elements and the tree branches which represent the references to the corresponding child elements. It also can be taken from [1] that the TBCs can be divided up into two components, namely schema branching and position information, whereby the schema information is derived from the elements that occur in the schema as child elements, whereas the position information contains the position information for those elements which can occur multiple times. The possible types of child elements in these cases are complex type elements which, in their turn, can contain other child elements, but also simple type elements or attributes that cannot contain child elements. The length of the field #position is defined by the maximum number ("maxOccurs") of the element concerned which is specified in the schema.

To move around in the document, the TBS (i.e., the Schema Branch Codes) and, if necessary, the position codes are concatenated, which produces a path in the document. If the desired element is reached, the last code will be inserted in the table. If the desired element cannot have any further children (i.e., it is an attribute or a simple type), then this termination code is not necessary and will not be sent. In this case, the attribute or the simple type element is subsequently transmitted encoded. The present invention essentially consists of encoding string-based data types (i.e., updated types derived directly or indirectly from the data type string), of which the possible content is specified using regular expressions as in listed publication [4] (hereafter "[4]") and which, for example, can be represented as a tree-type structure. This is done in such a way that signal bits (flags) for optional parts and/or length information of the variable length codes are in accordance with a general method in a defined order and that by the processing of the information contained in the data type can be simplified by preceding information about the content, and the search for data can be accelerated by sorting out and bit mask interrogations. Furthermore, the present invention relates to a more efficient encoding of the #position field by assigning specific code fragments for each grouping of elements in accordance with the definition of the data type.

Additional features and advantages of the present invention are described in, and will be apparent from, the following Detailed Description of the Invention and the Figures.

BRIEF DESCRIPTION OF THE FIGURES

FIG. 2 shows a first representation of the regular expression shown in FIG. 1 together with the associated bit stream created for a string-based data type.

FIG. 3 shows a further representation of the regular expressions shown in FIG. 1 together with the associated bit stream for the string-based data type to assist in explaining the present invention.

FIG. 4 shows a representation for a regular expression to explain the improvement in encoding efficiency in accordance with the present invention.

DETAILED DESCRIPTION OF THE INVENTION

Figure 1:
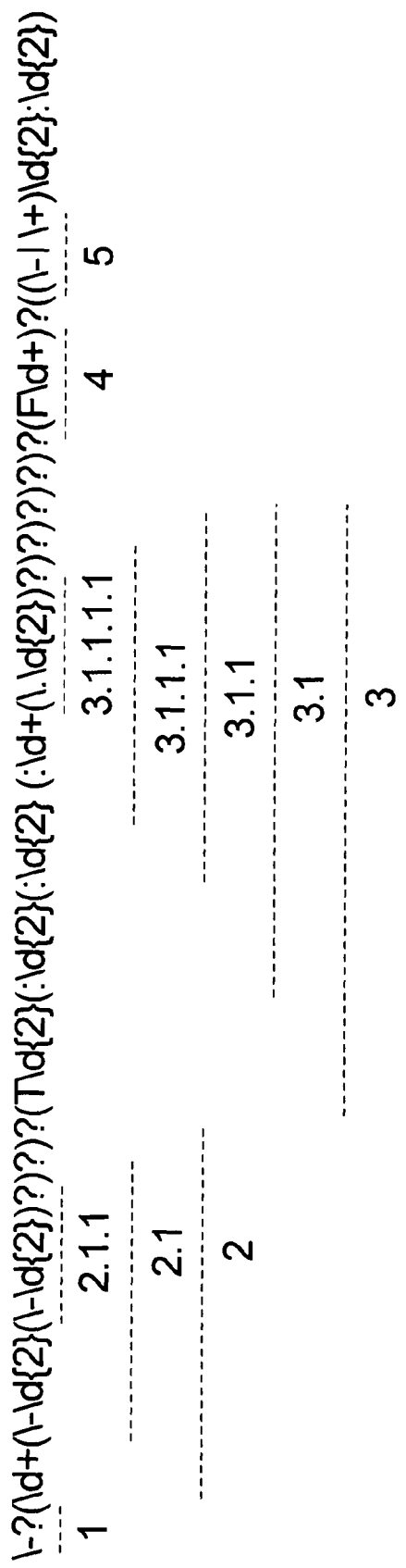
FIG. 1 shows a regular expression for definition of a string-based data type with a number of nested optional parts.

FIG. 1 shows a description of a string-based data type specified by a regular expression with optional parts. The regular expressions contained in the definition of the data type are for example specified in more detail in [4]. Below the regular expressions of simple optionally present parts 1, and 5 as well as nested optional parts 2, 2.1, 2.1.1 or 3, 3.1, 3.1.1, 3.1.1.1, and 3.1.1.1.1 indicated by the corresponding dashes.

FIG. 2 shows a representation RRA1(T(S)) for a string-based data type T(S) specified by the regular expression S of FIG. 1 with the aid of flags numbered in accordance with the optional parts, in which case here, as previously normal in [2], the relevant flag is followed directly by a corresponding interrogation of the flag as well as by the optionally included information data. In parallel to representation RRA1(T(S)) from top to bottom, a bit stream BS1 is specified a line-by-line with the relevant number of bits. As can be shown in the above example, the classes, for example \d{2}, of the authorized characters, called data fields below, then can be encoded with specific binary representations. Variable-length data fields such as "\d+" will be encoded here with variable-length codes, whereby specific bits, such as every ninth bit, signal whether further bits (for example, nine bits), follow.

In the existing method for encoding string-based data types, the regular expressions are used to encode the structure of the instantiation. However, to evaluate coded data of this data type, the entire data stream must be read in in order to be able to establish that relevant paths for the recipient (that is, the corresponding data fields), are contained in the data stream. Furthermore, it is not possible for the decoder to determine in advance the resources required for decoding and storing the data fields, but it must do this in step with the decoding of the bit stream.

A representation for a regular expression of a string-based data type is known to a corresponding encoder or decoder by definition (Step 500, FIG. 5) or must be signaled to the latter accordingly.

FIG. 3 shows a representation changed in accordance with the invention RRA2(T(S)) for the regular expression S together with a corresponding further bit stream BS2. In this example the flags SOP for optional parts are initially stored in accordance with the encoding principle described in [2] but here they are stored at the beginning of bit stream BS2, before the length information LVLC of the variable-length data is subsequently stored (Step 510, FIG. 5).

The length information can, for example, be encoded as follows: The number of consecutive bits that are equal to 1 represent the number of data blocks used for the corresponding representation of variable-length data. If, as in the above example, the data block consists of eight bits, the binary code "1110" specifies a data length of 24 bits, for example, whereas the binary code "10" specifies a length of 8 bits. These computed data lengths are represented in this example with "8*VLC X".

The fact that in the present invention the signaling bits or flags for optional parts and/or length information of the variable-length codes is placed in a defined order, at the start of the bit stream, allows the search for data to be accelerated. Since the first flags signal whether the existing data can contain those parts of the regular expression for which the search is being made, it is not necessary to read in the entire bit stream BS2 to do this. Furthermore, as a result of the information about the data fields used and their length at the start of the bit stream, the rest of bit stream RBS can be compared for the search with a pre specified bit pattern.

FIG. 4 shows a representation of the definition for a complex data type T to be encoded in parallel with the relevant schema branching code SBC for the relevant position code #pos showing how a correspondent tree branching table is constructed. SBCs are assigned to the elements of a complex type element, such as in the order in which they occur in the definition, regardless of the grouping in which they occur or how deeply nested they are. When elements of the same type and/or the same name occur in two or more different groups within the specification of the complex type, different codes are also assigned. This schema branching code SBC uniquely defines which element is encoded within which, possibly nested, grouping. The position code #pos can be assembled in accordance with the nesting of the groupings. In this case, for each grouping which is a father of the element to be encoded, a code fragment, such as CF, is assigned in a fixed order; for example, beginning with the furthest away. In this case, depending on the maximum possible current for each of these groupings, a fixed bit length is used in each case. However a variable bit length, corresponding to the definition for encoding the position code, also can be used.

In the example of FIG. 4, elements a to c are assigned a schema branching code SBC in the order in which they occur. Element a occurs twice here, in which case on the second occurrence it is assigned a different code "100" instead of "001". The field for the position code #pos is made up of the following components or code fragments:

3 Bits XXX which determine the position within the outside sequence bracket;

Multiples of 4 Bits YYYY which determine the position within the choice bracket; and Multiples of 4 Bits ZZZZ which determine the position below the elements c.

The advantage of the method in accordance with the present invention, compared to the method described in the listed publication [3] (hereafter "[3]"), is that only the positions at which the elements involved actually can be positioned in accordance with the schema definition have to be encoded or addressed. In addition, a position code also only has to be transferred for elements of which there can be multiple instances. This enables the description structure to be encoded more efficiently. Another significant advantage produced is that the document can be expanded by additional elements at any given nesting level, which is often not possible in the method in accordance with [3] because of the sequentially assigned position codes.

Figure 5:
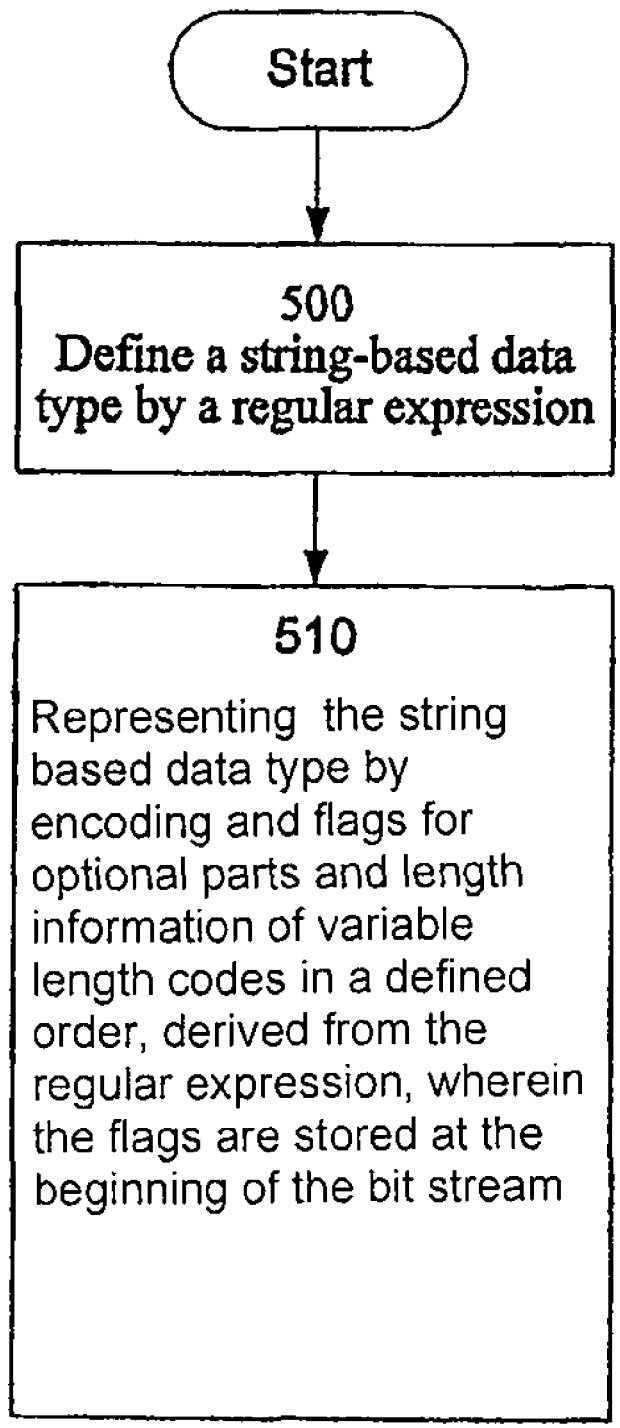
FIG. 5 is a flow diagram of the process of representing a regular expression through a bit stream in accordance with an embodiment.

FIG. 5 illustrates the process of changing a binary representation of XML-based content descriptions in a bit stream in accordance with an embodiment. At block 500, a string-based data type is defined by a regular expression. At block 510, the string-based data type is mapped by encoding and electronically storing signaling bits for at least one of optional parts and length information of variable-length codes in a defined order, derived from the regular expression, at a start of the bit stream for instantiation of the string-based data type.

Although the present invention has been described with reference to specific embodiments, those of skill in the art will recognize that changes may be made thereto without departing from the spirit and scope of the present invention as set forth in the hereafter appended claims.

The following publications are cited in this document:

[1] ISO/IEC CD 15938-1 Information technology—Multimedia content description interface: Systems, ISO/IEC JTC1 SC29/WG11/N3701, La Baule (France), October 2000

[2] Datatype encoding improvements for BiM, Cedric Thienot, Claude Seyrat, Gregoire Pau, ISO/IEC JTC1 SC29/WG11/M6853, Pisa (Italy), January 2001

[3] BiM navigation path improvements, Cedric Thienot, Claude Seyrat, Gregoire Pau, ISO/IEC JTC1 SC29/WG11/M6854, Pisa (Italy), January 2001

[4] from the Internet: http://www.w3.org/TR/xmlschema-2/#regexs

The invention claimed is:

1. A computer-implemented method for mapping a binary representation of XML-based content descriptions in a bit stream, the method comprising:

using a computer to define at least one string-based data type by a regular expression with parts selected from at least one of an optional part and a nested optional part;

using the computer to represent the regular expression of the string-based data type through a bit stream by encoding and electronically storing flags for the parts and length information of variable-length codes in a defined order such that the flags are positioned at a start of the bit stream for instantiation of the string-based data type, wherein the order is derived from the regular expression; and using the computer to transmit said bit stream to a receiving computer.

2. A method for mapping a binary representation of XML-based content descriptions as claimed in claim 1, the method further comprising searching data in the bit stream in at least one instantiation which includes initially checking flags for containing specific optional parts of the regular expression.

3. A method for mapping a binary representation of XML-based content descriptions as claimed in claim 1, the method further comprising searching data in the bit stream in at least one instantiation which includes initially using flags in advance in a decoder to provide corresponding resources for at least one of processing and storing contained data fields.

4. A method for mapping a binary representation of XML-based content descriptions as claimed in claim 2, the method further comprising using length information to generate a bit pattern for searching in a remaining bit stream.

5. A method for mapping a binary representation of XML-based content descriptions as claimed in claim 1, the method further comprising displaying an image based on at least a portion of the bit stream.

6. A computer program product comprising:
  a computer usable medium having computer readable program code embodied therein configured to generate a binary representation of XML-based content descriptions in a bit stream, said computer readable program code when executed on a computer is operable:
  to cause a computer to define a string-based data type by a regular expression with parts selected from at least one of an optional part and a nested optional part;
  to cause a computer to represent the regular expression of the string-based data type through a bit stream by encoding and electronically storing flags for the parts and length information of variable-length codes in a defined order such that the flags are positioned at a start of the bit stream for instantiation of the string-based data type, wherein the order is derived from the regular expression; and
  to transmit said bit stream.

7. A computer-implemented method for mapping a binary representation of XML-based content descriptions in a bit stream, the method comprising:
  using a computer to define at least one string-based data type by a regular expression with at least one optional part and at least one nested optional part;
  using the computer to represent the regular expression of the string-based data type through a bit stream by encoding and electronically storing flags for the at least one optional part and the at least one nested optional part and length information of variable-length codes in a defined order such that the flags are positioned at a start of the bit stream for instantiation of the string-based data type, wherein the order is derived from the regular expression; and
  using the computer to transmit said bit stream to a receiving computer.

\* \* \* \* \*